United States Patent
Raghunathan et al.

(10) Patent No.: US 7,881,006 B2
(45) Date of Patent: Feb. 1, 2011

(54) LONG-TERM ASYMMETRY TRACKING IN MAGNETIC RECORDING DEVICES

(75) Inventors: Aravind Raghunathan, E. Shakopee, MN (US); Kevin Dean Fruendt, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 399 days.

(21) Appl. No.: 12/028,131

(22) Filed: Feb. 8, 2008

(65) Prior Publication Data

US 2009/0201602 A1 Aug. 13, 2009

(51) Int. Cl.
*G11B 5/596* (2006.01)

(52) U.S. Cl. .................................. 360/77.02

(58) Field of Classification Search ............ 360/77.02, 360/75, 77.04, 77.06, 31, 55, 77.07
See application file for complete search history.

(56) References Cited

U.S. PATENT DOCUMENTS

| | | | |
|---|---|---|---|
| 3,967,317 A * | 6/1976 | Newell | 360/55 |
| 4,612,586 A | 9/1986 | Sordello et al. | |
| 5,070,495 A | 12/1991 | Bletscher, Jr. et al. | |
| 5,333,084 A | 7/1994 | Galloway et al. | |
| 5,446,600 A | 8/1995 | Galloway et al. | |
| 5,469,415 A | 11/1995 | Fujita et al. | |
| 5,784,296 A | 7/1998 | Baker et al. | |
| 6,043,943 A | 3/2000 | Rezzi et al. | |
| 6,147,828 A | 11/2000 | Bloodworth et al. | |
| 6,175,463 B1 | 1/2001 | Nayebi et al. | |
| 6,414,810 B1 | 7/2002 | Bollati et al. | |
| 6,529,340 B2 | 3/2003 | Gowda et al. | |
| 6,587,292 B1 | 7/2003 | Ashley et al. | |
| 6,594,094 B2 | 7/2003 | Rae et al. | |
| 7,084,624 B2 | 8/2006 | Tokura et al. | |
| 2005/0248234 A1 | 11/2005 | Hoshino | |
| 2007/0019317 A1 | 1/2007 | Brianti et al. | |
| 2007/0025005 A1 * | 2/2007 | Shimizu | 360/31 |
| 2007/0247226 A1 | 10/2007 | Bollati et al. | |

* cited by examiner

*Primary Examiner*—Fred Tzeng
(74) *Attorney, Agent, or Firm*—Deirdre Megley Kvale; Westman, Champlin & Kelly, P. A.

(57) ABSTRACT

A technique tracks head asymmetry of a magnetic recording device over time. In particular, a reference pattern having a known fundamental/reference frequency may be read from a reserved track of a magnetic recording medium to produce a response signal, and signal power may then be determined at the reference frequency and at a second harmonic component frequency of the reference frequency. Accordingly, head asymmetry for the device may be tracked based on a ratio of the signal power at the second harmonic component frequency to the signal power at the reference frequency.

20 Claims, 5 Drawing Sheets

LONG-TERM ASYMMETRY TRACKING IN MAGNETIC RECORDING DEVICES

BACKGROUND

This invention relates generally to recording devices. Read heads are commonly used in sub-systems that retrieve data from storage media in high-performance data storage devices. For example, magneto-resistive (MR) heads (or transducers) are used to read data from magnetic storage media, such as hard disk drives, tape drives, and so forth. The data are stored on the media as a series of changes in magnetic flux, and the MR head reads the data by sensing the magnetic flux and producing a differential voltage signal, also called a response signal, that includes a corresponding series of peaks with polarities that are determined by the direction of the magnetic flux. The MR head then transfers the response signal to a read channel, which reproduces the data.

The MR heads often produce asymmetric response signals. The asymmetry, which is typically caused by characteristics (magnetic nonlinearity) of the read head (and may thus be referred to as "head asymmetry"), may be defined as the relative difference between the amplitudes of positive and negative peaks in the response signal (e.g., normalized by their average value). In an ideal situation (symmetric), both the positive and negative pulses of the response signal should have the same amplitude. In the case of asymmetry, however, positive and negative pulses of the response signal differ in amplitude, and in some cases by a large amount. Typical values for the asymmetry range from 10% to 20%, although higher values (up to 30%) can be measured.

The head asymmetry impacts the performance of the read subsystem in recording systems (e.g., disc drives), which in effect impacts overall field reliability. For instance, erroneous signal detection may occur, resulting in lost data or data that is difficult to retrieve (e.g., through error correction). In conventional data retrieval systems, the asymmetry of the response signal may be compensated for by setting different thresholds for positive and negative pulses, typically accomplished during the manufacturing process after a response signal has been sampled and digitized. For example, if there is head asymmetry of 10-20% in the system, such asymmetry may be corrected through calibration. (Generally, if the head asymmetry is greater than 30-40%, the system may not be able to account for such drastic asymmetry in read pulse amplitudes.)

Notably, the calibration during the manufacturing process compensates for the head asymmetry that is based on the initial physical characteristics of the read head. However, a problem that arises after the calibration is that once the read subsystem leaves the manufacturing process, changes in asymmetry due to aging of the device (or other factors) over time are no longer compensated for, and the changes may thus impact the performance of the read-write subsystem, and may ultimately result in failure of the system (e.g., partial or full failure), caused by an inability to properly distinguish and/or interpret signals.

SUMMARY

According to one or more embodiments described herein, head asymmetry of a magnetic recording device may be tracked over time. In particular, a reference pattern having a known fundamental frequency may be read from a reserved track of a magnetic recording medium to produce a response signal, and signal power may then be determined at the fundamental frequency and at a second harmonic component frequency. Accordingly, head asymmetry for the device may be tracked based on a ratio of the signal power at the second harmonic component frequency to the signal power at the fundamental frequency.

BRIEF DESCRIPTION OF THE DRAWINGS

The embodiments described herein may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
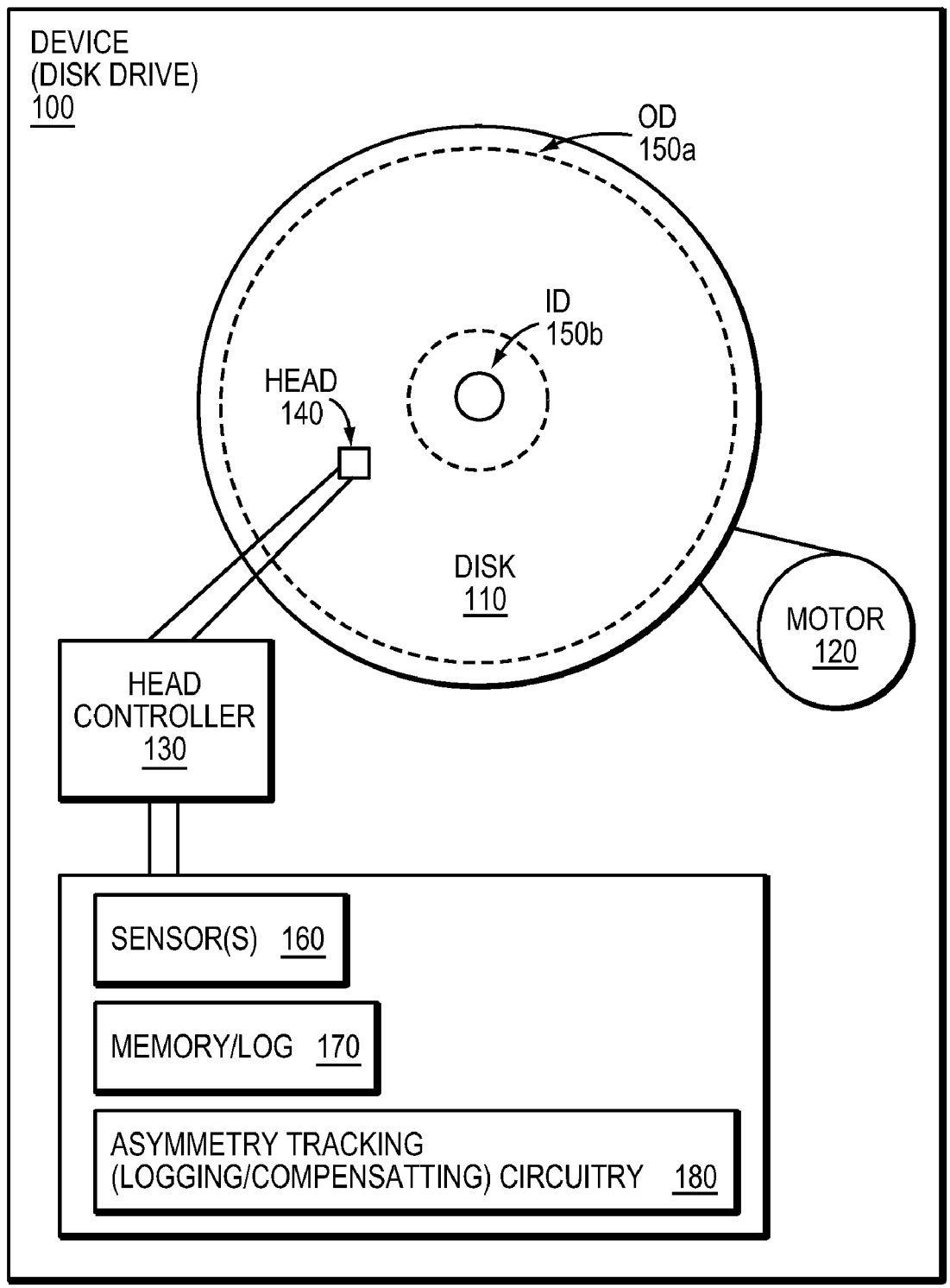
FIG. 1 illustrates an example recording device.

FIG. 1 illustrates an example magnetic recording device, e.g., disk drive 100, that comprises a magnetic recording medium, such as a magnetic disk 110, that advantageously may be used in accordance with the illustrative embodiments. The disk 110 may comprise, for example, a magnetic recording layer deposited on a substrate, as will be understood by those skilled in the art. The disk also may contain other magnetic or non-magnetic layers, such as a soft magnetic underlayer, exchange-coupled layer, lubrication layer, carbon overcoat, etc., which are not explicitly shown. The recording layer may be fabricated using various ferromagnetic materials and alloys, e.g., embodied as thin-film or particulate media, and may be deposited on the substrate using a variety of deposition techniques known in the art. The substrate also may be constructed from various materials, such as glass or conventional aluminum-magnesium substrates used for magnetic disks. The disk drive 100 may also comprise a motor 120 used to spin the disk 110 (e.g., 15 K rpm), as well as a head controller 130 to control a read-write head 140, as will be understood by those skilled in the art. Notably, while a magnetic disk drive 100 is shown, any suitable device or transmission medium (e.g., an optical drive, tape drive, physical/wireless communication channels etc., denoted herein as "device 100") may be used in accordance with one or more embodiments described herein. Also, while a single disk 110 and read-write head 140 are shown, those skilled in the art will understand that a platter of disks 110 may be used (e.g., stacked vertically) along with a corresponding set of additional read-write heads 140, and the view shown herein is for simplicity and is merely to be taken as a representative example. Also, while read-write heads 140 are one illustrative example, other magneto-resistive devices (e.g., transducers) may also be utilized, accordingly.

The present invention provides tracking of asymmetry of a recording device, e.g., head asymmetry. In particular, according to one or more embodiments described herein, a pre-written reference pattern may be read, producing signal power at a fundamental (reference or "parent") frequency and at a second harmonic component frequency of the fundamental/reference frequency. A ratio of the signal power at the second harmonic component frequency to the signal power at the fundamental frequency may be used to track head asymmetry for the device. This asymmetry, over time, may be used as a measure for pre-dicting device failure, as well as for debugging and failure analysis. Illustratively, the techniques described herein in accordance with the present invention may be performed by configured circuitry (e.g., hardware, software, and/or firmware) within device 100. In particular, as described in more detail below, recording device 100 may further comprise various sensors 160, memory/log locations 170, and asymmetry tracking (e.g., and logging/compensating) circuitry 180 that may cooperatively operate in accordance with one or more embodiments described herein to perform the novel techniques associated with tracking head asymmetry of a recording device.

Figure 2A:
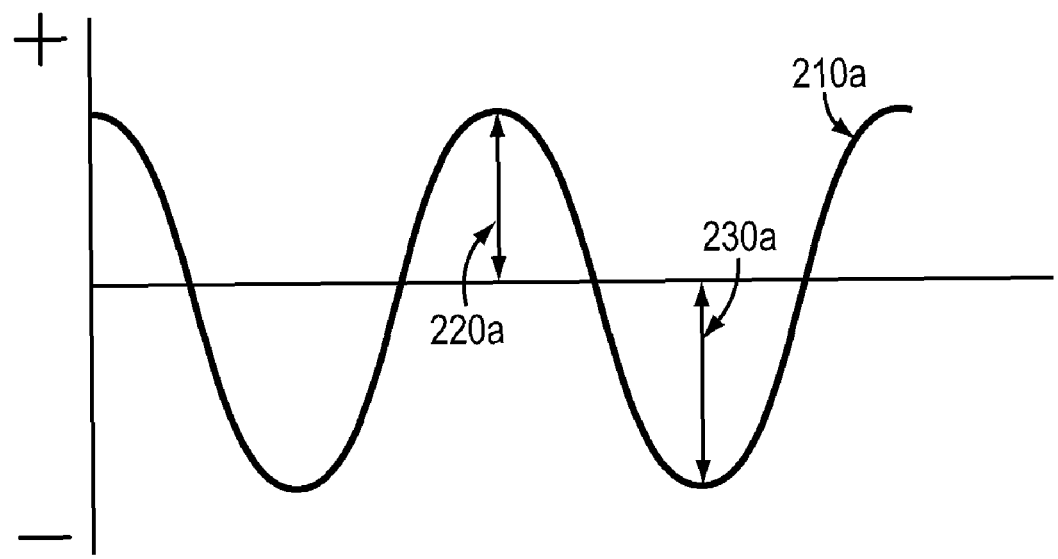
FIGS. 2A-B illustrate an example reference pattern and read back signal, respectively.
Figure 2B:
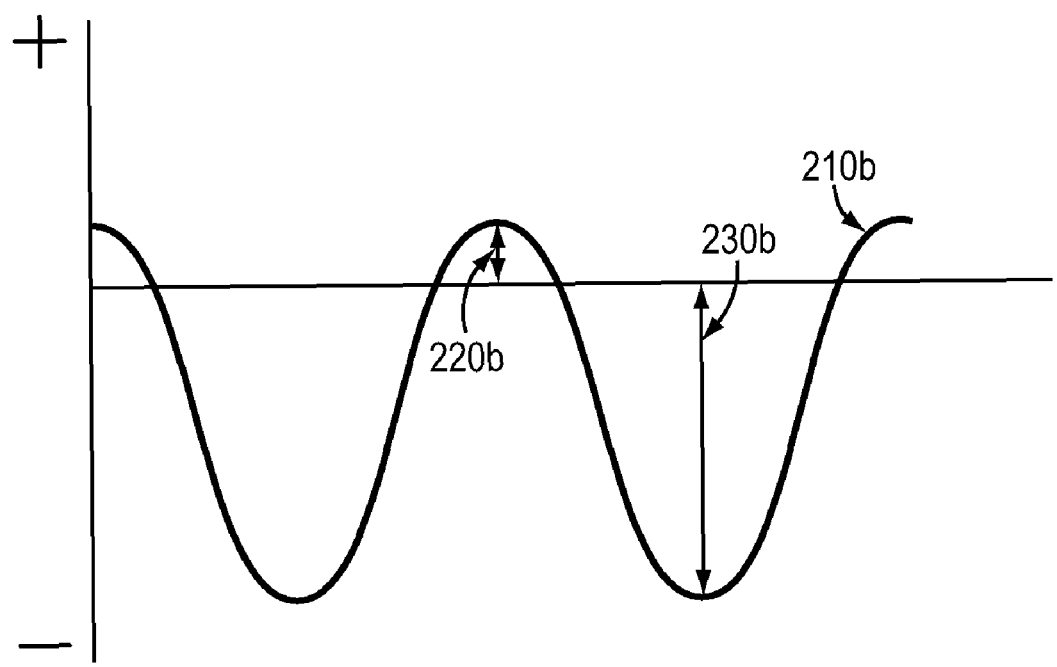

Conventionally, certain devices (e.g., disk drives 100) have circuitry in place to compensate for head asymmetry (up to a certain level). Specifically, a typical manufacturing process subjects each head 140 to an asymmetry compensation/calibration to account for head asymmetry originally present in the system. For example, to calculate an initial asymmetry measure, an asymmetry compensation circuit may be initiated to determine a positive peak and a negative peak of a reference pattern. For instance, FIG. 2A illustrates an example reference pattern 210a, e.g., an oscillating pattern (e.g., in the time domain), as will be appreciated by those skilled in the art. If the read pattern (the response signal) is symmetric, then the positive peak value 220a and negative peak value 230a have equal amplitudes. However, as shown in FIG. 2B, "head asymmetry" may result in the response signal asymmetry shown (signal 210b), where, illustratively, the positive peak 220b has a lower amplitude than that of the negative peak 230b. The actual measure of asymmetry may be calculated as the difference in the amplitudes of positive peak 220 and negative peak 230 divided by the sum of the amplitudes of both peaks 220 and 230. For certain values of asymmetry (e.g., 1-30%) during the manufacturing process, asymmetry compensating circuitry 180 may compensate accordingly in order to reduce resultant read back signal errors/difficulties.

Once the manufacturing process is complete, however, and the original asymmetry is substantially compensated for, no effort is currently put in place to track asymmetry changes that happen in the field, where the changes may provide valuable information regarding head stability related failures that impact field reliability. In other words, asymmetry is a key metric that can be used for tracking head stability related failure mechanisms, which when tracked over the life of the device 100 may provide valuable information about critical failures that impact field reliability of the devices.

Operationally, in accordance with one or more embodiments of the present invention, it has been determined that head asymmetry introduces signal power at the second harmonic component frequency. Particularly, if the signal is substantially symmetric, significant read back power may be detected at the first (fundamental) and third harmonic frequencies. On the other hand, as may be appreciated by those skilled in the art, if the signal is asymmetric, then the power at the second harmonic frequency is increased. According to one or more embodiments described herein, this fact may be used to track long-term asymmetry change in the field.

In order to track asymmetry in the field, a dedicated/reserved track of the recording medium (e.g., disk 110) may have written thereon a known reference pattern 210, e.g., a constant tone pattern. For example, the reserved track (or reference track) 150 of a disk 110 may be located at an inner diameter (ID) 150a and/or an outer diameter (OD) 150b of the disk (see FIG. 1). Illustratively, the reserved track 150 may be a region of the recording medium (e.g., disk 110) that is outside of the user band, i.e., that a user is unable to access for read/write access of user data. In this manner, the reference pattern 210 on the reserved track 150 may be written during the manufacturing process and remains substantially in tact for the life of the device 100. The reference pattern 150 itself may be illustratively a constant tone that is able to produce a second harmonic when the read back signal is asymmetric, such as a signal between a perfect sine wave (i.e., where perfect sine waves generally produce no harmonics), to a square wave (i.e., which produces many harmonics), as will be appreciated by those skilled in the art. Example reference patterns 210 comprise, inter alia, 2T, 4T, 6T, and 8T patterns, e.g., where "4T" references a pattern that has ¼ of the frequency of the fundamental frequency, etc.

Once the device is operating in the field environment, e.g., by a user, a background process (e.g., of asymmetry tracking circuitry 180) may be triggered to make all heads 140 seek to the dedicated/reserved track 150 and read the written reference pattern 210 (with a known fundamental/reference frequency), which may then be processed to determine signal power at specified frequencies. For instance, the trigger may be based on specified time intervals, such as where during field operation, a firmware timer is set to periodically read the recorded tone patterns at the specific timing intervals. Other triggers may cause the process to operate, such as read errors, etc.

In particular, upon receiving a trigger, the asymmetry tracking circuitry 180 may operate to produce a response signal by reading the reference pattern 210 (from track 150), and may determine the signal powers at the fundamental and second harmonic component frequencies. Specifically, one or more harmonic sensor circuits (HSCs) or sensors 160 may be tuned to identify/determine signal powers at the selected frequencies (e.g., fundamental and second harmonic). For example, a first sensor may be tuned (e.g., during the manufacturing process for the device) to determine signal power magnitude at the fundamental frequency of the reference pattern 210, while a second sensor may be tuned to determine signal power magnitude at the second harmonic component frequency.

Figure 3:
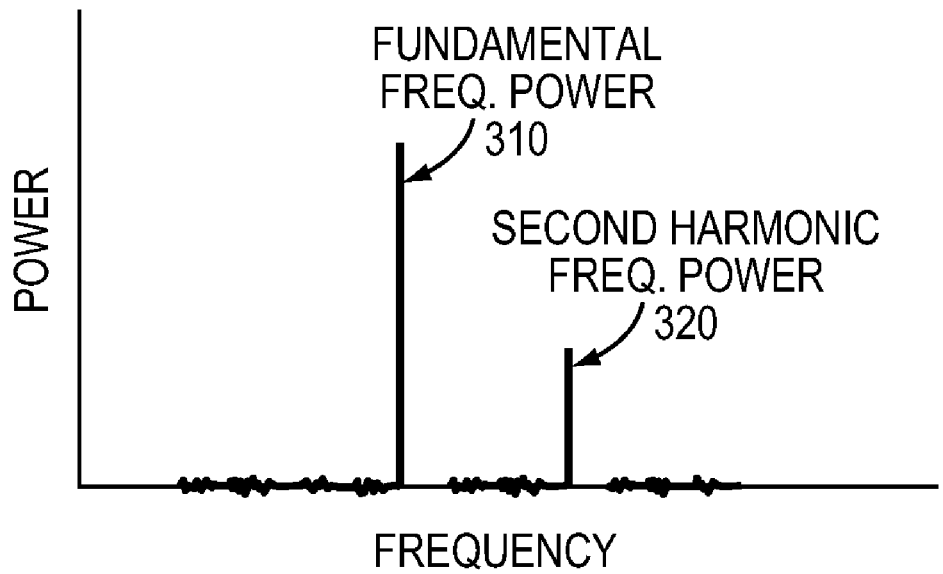
FIG. 3 illustrates an example graph of power values at a fundamental frequency and at a second harmonic component frequency.

According to one or more embodiments described herein, the ratio of the signal powers may be used as a metric to track asymmetry changes of the device while in the field. Particularly, by determining signal powers of the response signal at the fundamental frequency and at a second harmonic component frequency (indicative of head asymmetry), asymmetry tracking circuitry may track head asymmetry for the device 100 (disk 110). In other words, once the data is read from the reference track, a "harmonic ratio" can be calculated by dividing the signal power at the second harmonic component frequency by the signal power at the fundamental frequency. For example, FIG. 3 illustrates an example graph showing signal power at the fundamental frequency (310) and at the second harmonic component frequency (320), e.g., in the frequency domain.

Figure 4:
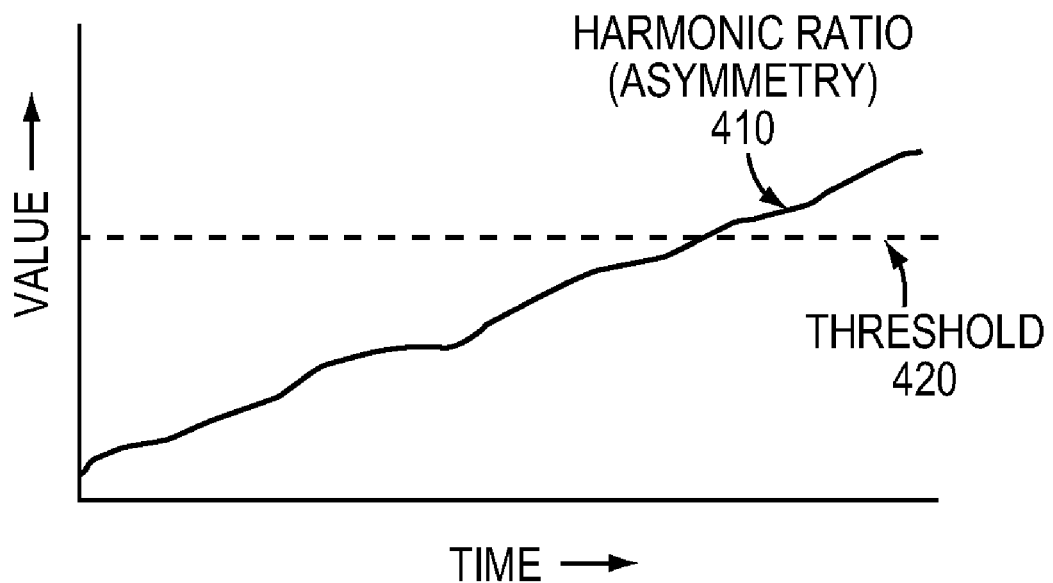
FIG. 4 illustrates an example graph of tracked head asymmetry.

Changes in the harmonic ratio may then be used as a metric to gauge asymmetry change over time. That is, there is a substantial correlation between the harmonic ratio increases and changes in response signal asymmetry, and as such, tracking the harmonic ratio calculated from signal powers of the known reference pattern 210 essentially provides a manner in which head asymmetry may be tracked, accordingly. Asymmetry values (or, e.g., the harmonic ratio values) may be tracked over time, and stored in a memory/log 170 of the device 100 to be used for predictive measurements and accounting. For instance, FIG. 4 illustrates an example graph of tracked asymmetry values 410 over time (e.g., logged by asymmetry logging circuitry 180).

By tracking head asymmetry of a device 100 (disk 110), failure of the device/disk may be predicted, and such a predicted failure may be reported, e.g., to a user or administrator (e.g., error messages/emails/reports), or simply to a log 170. For instance, SelfMonitoring, Analysis, and Reporting Technology, or S.M.A.R.T. (or SMART), is a logging/monitoring system for computers (hard disks) to detect and report on various indicators of reliability, e.g., to predict/anticipate failures before they occur. For example, as shown in FIG. 4, a threshold 420 may be used to predict failure, such as when the asymmetry (harmonic ratio) reaches a value greater than a certain pre-defined amount, e.g., 30-40%. Other failure predictions may also be made, however, such as rapid increases or "spikes" in the asymmetry values 410 (i.e., a measure of the slope of the graph), or an oscillation of the asymmetry values 410 (e.g., indicating an unstable system), etc.

Notably, under certain circumstances/configurations, it may be possible to compensate for head asymmetry for the device/disk (100/110) in the field based on the calculated harmonic ratio. For instance, prior to failure prediction, the device 100 (e.g., asymmetry compensating circuitry 180) may compensate for asymmetry based on the harmonic ratio (asymmetry values 410) in a similar manner to the compensation performed during the manufacturing process above. That is, circuitry 180 may be configured to adjust the response signal thresholds and/or other necessary firmware of the channel in order to reduce the harmonic ratio to acceptable levels in order to prevent device failure (e.g., up to a certain correctable amount, e.g., 30-40%).

Moreover, in addition to predicting failure (and possible compensation prior to failure), the tracked asymmetry values 410 (e.g., in memory/logs 170) may be used during debugging and/or failure analysis (FA), such as where the device 100 has already failed. That is, to determine a possible cause of failure, the memory/log 170 may be accessed to provide potentially valuable insight (e.g., to a manufacturer) into the possible cause of the device failure.

Figure 5:
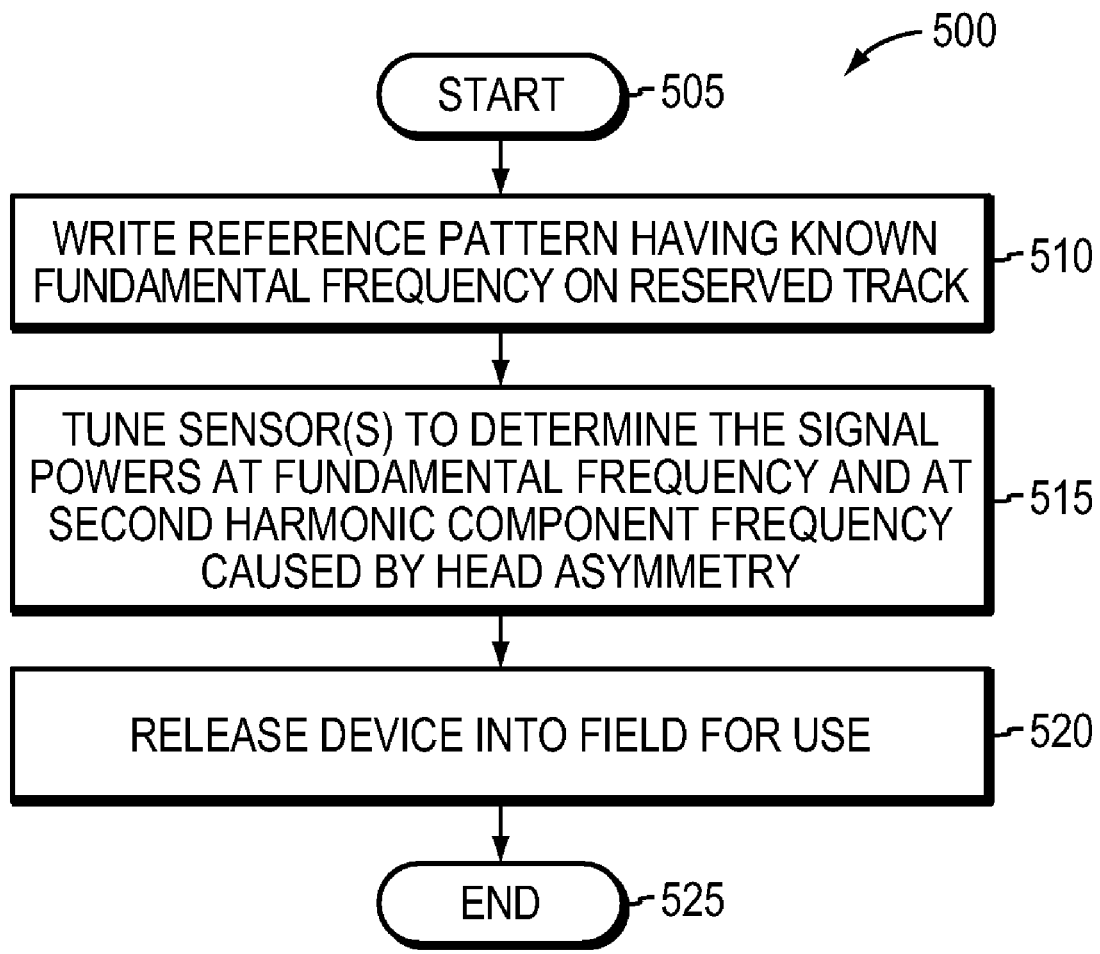
FIG. 5 illustrates an example procedure that prepares a recording device for tracking head asymmetry.

Briefly, FIG. 5 illustrates an example procedure that prepares a recording device for tracking head asymmetry in accordance with one or more embodiments of the present invention. The procedure 500 starts at step 505, and continues to step 510, where a reference pattern 210 having known fundamental frequency (e.g., 210*a*) is written on a reserved track 150 of the magnetic recording medium, e.g., ID (150*b*) and/or OD (150*a*) of a disk 110. Also, in step 515, sensor(s) 160 are tuned to determine the signal powers at the fundamental frequency and at the second harmonic component frequency, indicative of head asymmetry, as described above. In step 520, the device 100 may be released into the field for use, e.g., shipped to an end user, and the procedure 500 ends in step 525.

Figure 6:
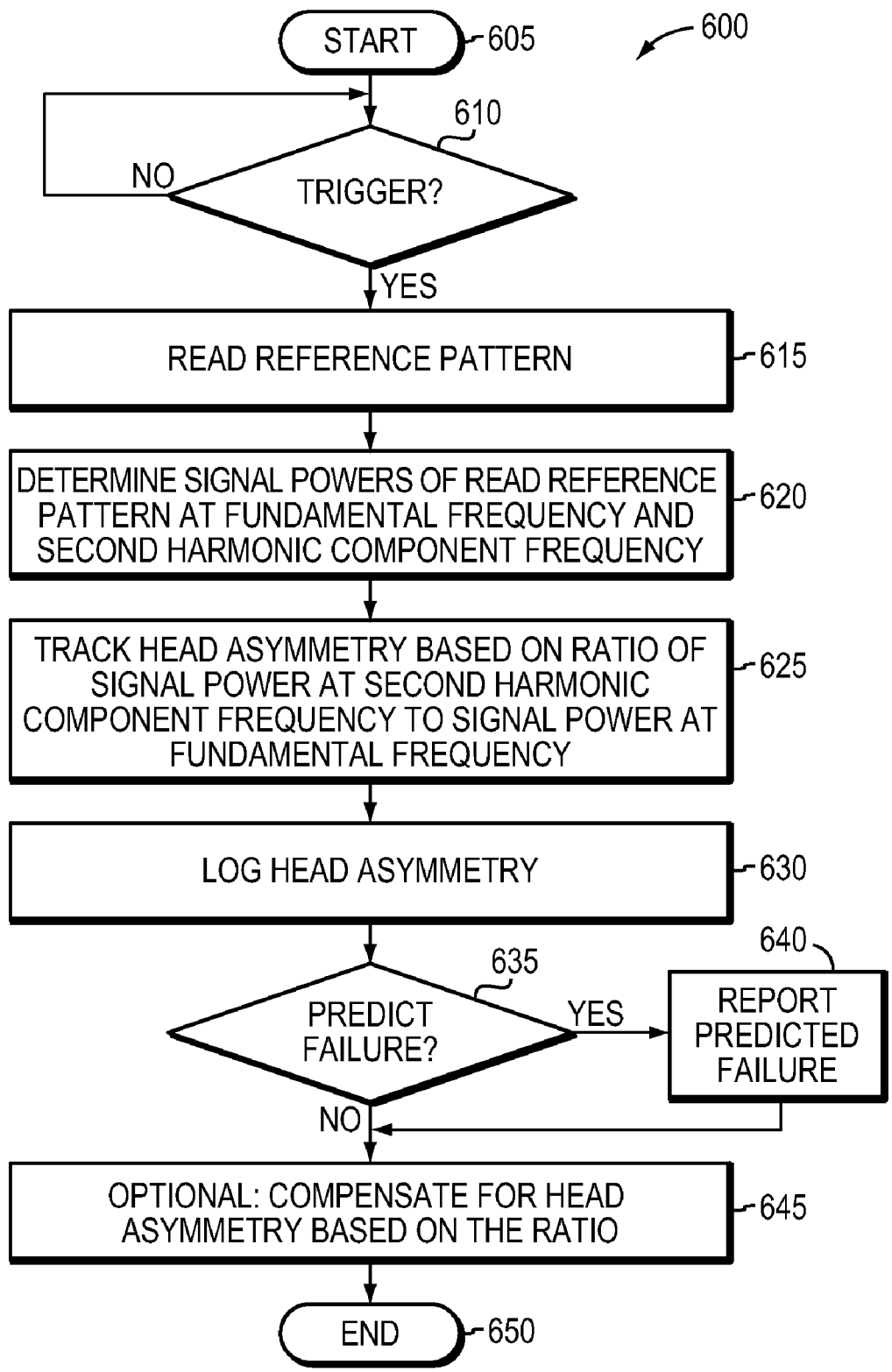
FIG. 6 illustrates an example procedure that tracks head asymmetry of a recording device.

FIG. 6 illustrates an example procedure that tracks head asymmetry of a recording device in accordance with one or more embodiments of the present invention, for instance, in the field after completion of procedure 500 of FIG. 5 above. The procedure 600 starts at step 605, and continues to step 610, where a trigger is detected, such as a periodic timer, explicit request, or other trigger. Once the trigger is detected, the reference pattern 210 (e.g., 210*b*) may be read in step 615 from the reserved track 150 to produce a response signal. Using the tuned sensor(s) 160, in step 620 the signal powers of the response signal may be determined at the fundamental frequency (310) and the second harmonic component frequency (320). As described above, in step 625, head asymmetry may be tracked based on the ratio of the signal power at the second harmonic component frequency to the signal power at the fundamental frequency.

The tracked head asymmetry (410) may be logged in step 630 (e.g., in memory 170, for example, as values 410), and if a failure is predicted in step 635 (e.g., based on thresholds 420, trends, etc.), then the predicted failure may be reported in step 640. (Note that when used for post-failure diagnostics, the head asymmetry may be logged and reported without "predicting" failure, as may be appreciated by those skilled in the art.) Whether or not failure is predicted in step 635 (and assuming that the head asymmetry is tracked pre-failure), if so equipped, the device 100 may compensate for the tracked head asymmetry based on the ratio in optional step 645 as mentioned above. The procedure 600 ends in step 650, notably with the possibility of receiving another trigger in step 610, in which case procedure 600 may begin again to further track head asymmetry in the field.

While there have been shown and described illustrative embodiments that track head asymmetry of a recording device, it is to be understood that various other adaptations and modifications may be made within the spirit and scope of the present invention. For example, the embodiments have been shown and described herein with/using OD and ID locations of a disk for the reserved track. However, the embodiments of the invention in its broader sense are not so limited, and may, in fact, be used with any reserved track location that is beyond a user band, i.e., a location not modifiable by a user. For instance, for tape media, certain portions may be designated as read-only portions on sophisticated devices. Further, while the embodiments described above illustrate magnetic media, certain other types of recording media may also benefit from the techniques described herein, such as certain optical recording media.

In addition, while the above description primarily discusses asymmetry tracking for use with failure prediction, it is important to note that the asymmetry determined by the techniques described above may also be used for failure analysis (e.g., post failure of the device), such as by a service technician attempting to determine a cause of failure.

Advantageously, the novel techniques described herein track head asymmetry of a recording device. By computing and logging the harmonic ratio (e.g., of the second harmonic), the novel techniques may advantageously track head asymmetry, which may be used as a measure for predicting device failure, as well as for debugging and failure analysis. For instance, as mentioned above, head asymmetry may be a valuable addition to the metrics utilized in accordance with SMART technology for failure prediction and analysis. Further, the novel techniques provide for monitoring asymmetry in the field (in use) for which certain adjustments may be performed for appropriate compensation.

While there have been shown and described illustrative embodiments that track head asymmetry of a recording device, it is to be understood that various other adaptations and modifications may be made within the spirit and scope of the present invention. For example, the embodiments have been shown and described herein with relation to a reference pattern written on a reserved track, such as the ID or OD of a disk. However, the embodiments of the invention in their broader sense are not so limited, and may, in fact, be used with other suitable reference pattern locations that exist or are to be developed, such as embedded signals within the medium. Also, while the description above references a ratio of signal power, it may be appreciated by those skilled in the art that other measurements based on (derived from or related to) the signal power may also be used in a similarly applicable manner, and such uses are within the scope of the embodiments described herein.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
producing a response signal by reading a reference pattern of a magnetic recording medium, the reference pattern having a known reference frequency;
determining signal powers of the response signal at the reference frequency and at a second harmonic component frequency of the reference frequency; and
tracking head asymmetry based on a ratio of the signal power at the second harmonic component frequency to the signal power at the reference frequency.

2. The method as in claim 1, further comprising:
tuning one or more sensors to determine the signal powers at the reference frequency and second harmonic component frequency.

3. The method as in claim 1, further comprising:
writing the reference pattern on at least one of either an inner diameter (ID) track or outer diameter (OD) track of the medium.

4. The method as in claim 1, further comprising:
triggering the producing, determining, and tracking at specified time intervals.

5. The method as in claim 1, further comprising:
logging the tracked head asymmetry.

6. The method as in claim 1, further comprising:
predicting failure based on the tracked head asymmetry.

7. The method as in claim 1, wherein the reference pattern is written during manufacturing of a magnetic recording device having the magnetic recording medium.

8. The method as in claim 1, wherein the reference pattern is a constant tone selected from a group consisting of: 2T, 4T, 6T, and 8T patterns.

9. The method as in claim 1, further comprising:
compensating for head asymmetry based on the ratio.

10. An apparatus, comprising:
first circuitry configured to produce a response signal by reading a reference pattern of a magnetic recording medium, the reference pattern having a known reference frequency;
second circuitry configured to determine signal powers of the response signal at the reference frequency and at a second harmonic component frequency of the reference frequency; and
third circuitry configured to track head asymmetry based on a ratio of the signal power at the second harmonic component frequency to the signal power at the reference frequency.

11. The apparatus as in claim 10, further comprising:
a read head as the first circuitry.

12. The apparatus as in claim 10, further comprising:
one or more sensors as the second circuitry.

13. The apparatus as in claim 10, further comprising:
a disk as the recording medium.

14. The apparatus as in claim 13, wherein the first circuitry is further configured to read the reference pattern from at least one of either an inner diameter (ID) track or outer diameter (OD) track of the disk.

15. The apparatus as in claim 10, wherein the first, second, and third circuitries are further configured respectively to produce, determine, and track at specified time intervals.

16. The apparatus as in claim 10, further comprising:
fourth circuitry configured to predict failure based on the tracked head asymmetry.

17. A method, comprising:
tracking asymmetry of a magnetic recording device;
logging the asymmetry in a memory of the magnetic recording device; and
predicting failure of the magnetic recording device based on the tracked asymmetry.

18. The method as in claim 17, further comprising:
tracking asymmetry based on a second harmonic frequency of a reference pattern on a magnetic recording medium of the device.

19. The method as in claim 18, wherein the reference pattern is a reference frequency, the method further comprising:
tracking asymmetry based on a ratio of a signal power at the second harmonic component frequency to a signal power at the reference frequency.

20. The method as in claim 17, wherein the asymmetry is caused by a read head of the magnetic recording device.

* * * * *